US012707063B2

(12) United States Patent
Yoshizumi et al.

(10) Patent No.: US 12,707,063 B2
(45) Date of Patent: Aug. 11, 2026

(54) IMAGE INFORMATION RECEPTION APPARATUS, IMAGE INFORMATION TRANSMISSION APPARATUS, AND PROGRAM AND METHOD USED THEREIN

(71) Applicant: DENSO CORPORATION, Kariya-city (JP)

(72) Inventors: Osamu Yoshizumi, Kariya-city (JP); Yasunobu Sugiura, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 618 days.

(21) Appl. No.: 17/806,028

(22) Filed: Jun. 8, 2022

(65) Prior Publication Data

US 2022/0303547 A1 Sep. 22, 2022

Related U.S. Application Data

(63) Continuation of application No. PCT/JP2020/036204, filed on Sep. 25, 2020.

(30) Foreign Application Priority Data

Dec. 12, 2019 (JP) ................................ 2019-224817

(51) Int. Cl.
*H04N 19/159* (2014.01)
*H04L 47/10* (2022.01)
(Continued)

(52) U.S. Cl.
CPC ........... *H04N 19/159* (2014.11); *H04L 47/10* (2013.01); *H04N 19/105* (2014.11); *H04N 19/152* (2014.11)

(58) Field of Classification Search
CPC .. H04N 19/159; H04N 19/105; H04N 19/152; H04N 19/115; H04N 19/172;
(Continued)

(56) References Cited

U.S. PATENT DOCUMENTS

2010/0316066 A1* 12/2010 Leung ................ H04N 21/6336 370/468
2012/0163452 A1* 6/2012 Horowitz ............. H04N 19/105 375/E7.243

(Continued)

FOREIGN PATENT DOCUMENTS

CN 110113610 A * 8/2019 ........... H04N 19/172
JP 2006-025064 A 1/2006
JP 2013-201623 A 10/2013

*Primary Examiner* — Atique Ahmed
(74) *Attorney, Agent, or Firm* — Precision Patents, P.C.

(57) ABSTRACT

An image information reception apparatus includes a receiving unit, a packet analyzing unit, and a transmission rate change processing unit. The receiving unit receives image information from an image information transmission apparatus through a communication network. The packet analyzing unit determines an actual reception variation that is based on variations in a reception interval of packets that are included in the image information. The transmission rate change processing unit performs a process to increase a target transmission rate of the image information transmission apparatus in response to the actual reception variation being greater than a predetermined value.

10 Claims, 14 Drawing Sheets

(51) Int. Cl.
*H04N 19/105* (2014.01)
*H04N 19/152* (2014.01)

(58) Field of Classification Search
CPC .... H04N 21/235; H04N 21/44; H04N 21/442; H04L 47/38; H04L 47/10
See application file for complete search history.

(56) References Cited

U.S. PATENT DOCUMENTS

2013/0278767 A1* 10/2013 Bernal ................. H04N 19/172 348/148
2014/0098880 A1* 4/2014 Seregin ................ H04N 19/463 375/240.16
2016/0112724 A1* 4/2016 Hendry ................ H04N 19/423 375/240.25
2016/0173805 A1* 6/2016 Claus ................. H04N 21/4223 348/148
2018/0102846 A1* 4/2018 Aoyama ................. G06F 16/51
2019/0073539 A1* 3/2019 Yu ........................... H04L 65/61
2019/0215522 A1* 7/2019 Zhang .................. H04N 19/176
2020/0258306 A1* 8/2020 Forutanpour ........... H04W 4/38

* cited by examiner

FIG.2A
I P P P I P
5 2 2 2 5 2
1/30s 1/30s 1/30s 1/30s 1/30s
FIG.2B
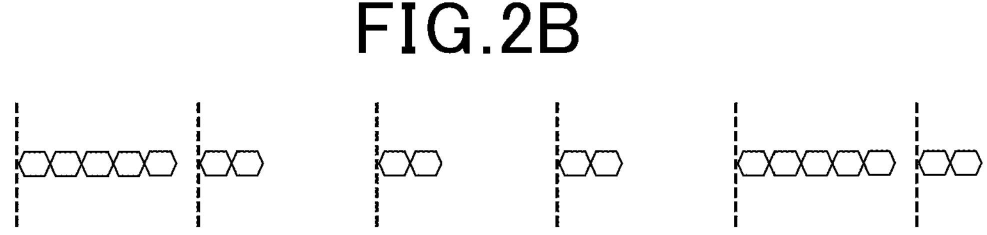
FIG.2C
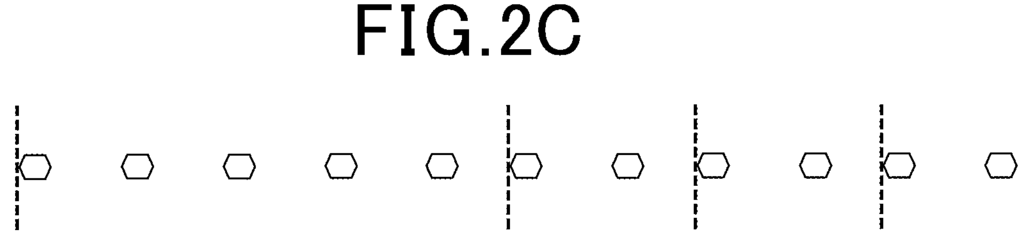

IMAGE INFORMATION RECEPTION APPARATUS, IMAGE INFORMATION TRANSMISSION APPARATUS, AND PROGRAM AND METHOD USED THEREIN

CROSS-REFERENCE TO RELATED APPLICATION

The present application is a continuation application of International Application No. PCT/JP2020/036204, filed on Sep. 25, 2020, which claims priority to Japanese Patent Application No. 2019-224817, filed on Dec. 12, 2019. The contents of these applications are incorporated herein by reference in their entirety.

BACKGROUND

Technical Field

The present disclosure relates to an apparatus that transmits and receives image information through a communication network.

Related Art

In recent years, technological developments related to autonomous driving vehicles that are capable of autonomous traveling through automatic acceleration, steering, and braking of a vehicle have intensified. In addition, development of unmanned autonomous driving vehicles that do not require a driver is also anticipated. In such autonomous driving vehicles, an operator and a remote monitoring system being capable of remotely visually monitoring a state of a vehicle and assisting in traveling of the vehicle as required is desired.

SUMMARY

One aspect of the present disclosure provides an image information reception apparatus that includes a receiving unit, a packet analyzing unit, and a transmission rate change processing unit. The receiving unit receives image information from an image information transmission apparatus through a communication network. The packet analyzing unit determines an actual reception variation that is based on variations in a reception interval of packets that are included in the image information. The transmission rate change processing unit that performs a process to increase a target transmission rate of the image information transmission apparatus in response to the actual reception variation being greater than a predetermined value.

BRIEF DESCRIPTION OF THE DRAWINGS

In the accompanying drawings:

FIGS. 2A to 2C are explanatory diagrams for explaining a mechanism of actual reception variation that is common across the embodiments of the present disclosure;

FIG. 6 is a flowchart illustrating operations of the image information reception apparatus according to the first embodiment of the present disclosure;

FIG. 7 is a flowchart illustrating operations of the image information transmission apparatus according to the first embodiment of the present disclosure;

FIG. 9 is a flowchart illustrating operations of the image information reception apparatus according to the second embodiment of the present disclosure;

FIG. 10 is a flowchart illustrating operations of the image information transmission apparatus according to the second embodiment of the present disclosure;

DESCRIPTION OF THE EMBODIMENTS

Figure 1:
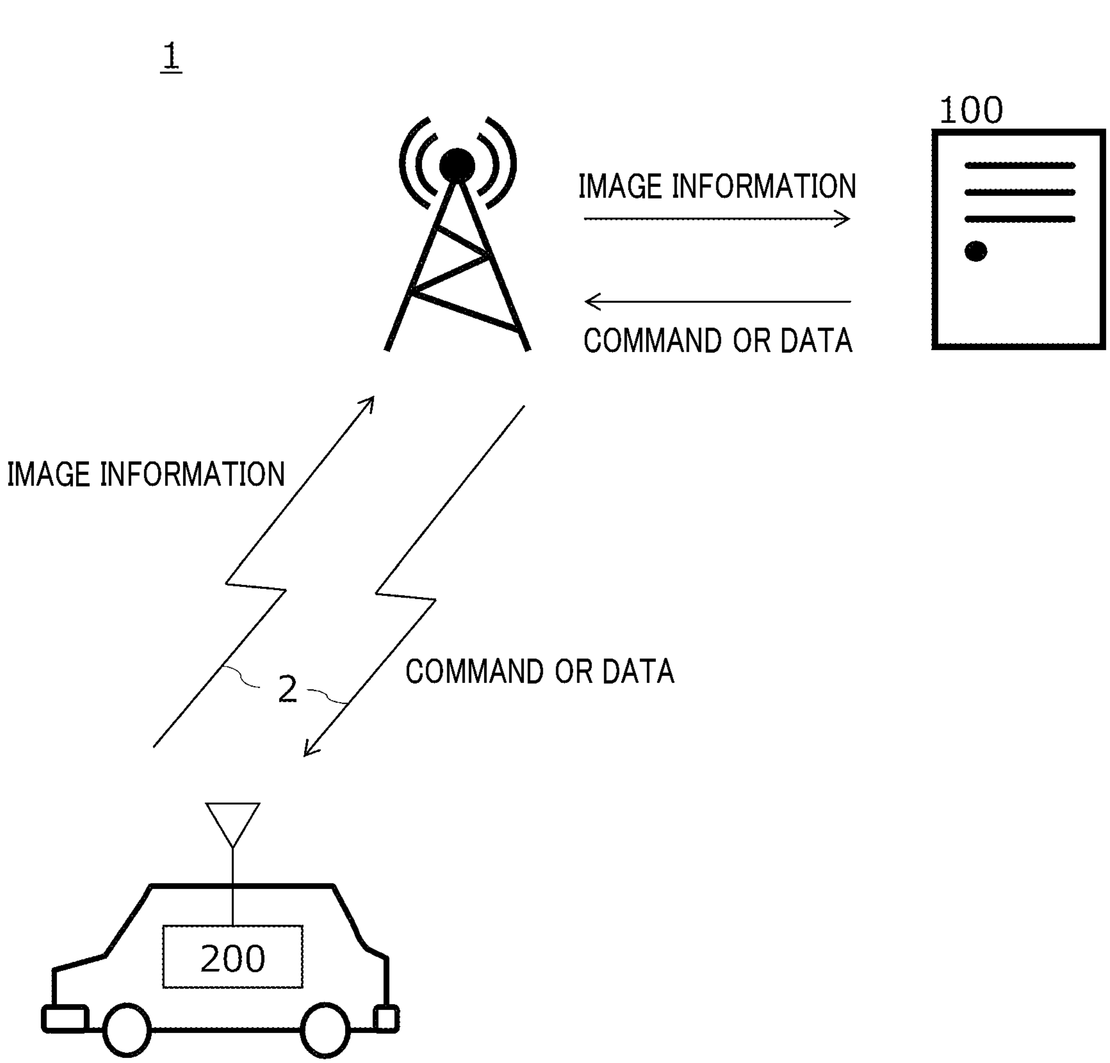
FIG. 1 is a configuration diagram illustrating a communication system that is common across embodiments of the present disclosure.

The present disclosure relates to an apparatus that transmits and receives image information through a communication network. Specifically, the present application relates to an image information reception apparatus and an image information transmission apparatus for transmitting and receiving image information that is transmitted from a vehicle or the like towards a center, at a transmission rate that is based on a communication bandwidth, and a program and a method that are used therein.

In recent years, technological developments related to autonomous driving vehicles that are capable of autonomous traveling through automatic acceleration, steering, and braking of a vehicle have intensified. In addition, development of unmanned autonomous driving vehicles that do not require a driver is also anticipated. In such autonomous driving vehicles, an operator and a remote monitoring system being capable of remotely visually monitoring a state of a vehicle and assisting in traveling of the vehicle as required is desired.

In such cases, image information is required to be acquired and generated by an imaging apparatus that is mounted in the vehicle capturing a moving image, and the image information is required to be transmitted over a wireless communication network to a center at which remote monitoring is performed.

However, transfer quality of the image information using wireless is largely dependent on variations in communication bandwidth. Therefore, when transmission is performed at a transfer rate that is equal to or greater than the communication bandwidth, delays and deficiencies in the video may occur. Consequently, transmission rate control for the image information based on the communication bandwidth is required to be performed.

JP-A-2013-201623 describes: measuring a transfer time by transmitting test data; calculating a bandwidth from the measured transfer time; determining, when the calculated bandwidth is less than a threshold, a type and a transmission method of data to be transmitted; and transferring the data.

However, because transmission and reception of test data that are originally unnecessary occur in JP-A-2013-201623, if this is applied particularly to a wireless communication network that has limited bandwidth, transfer of the image information is affected. In addition, a response cannot be made when an environment of the wireless communication network changes after transmission of the test data. Furthermore, determination regarding how high to increase a transmission rate of the image information when ample bandwidth is available is not described.

The inventors of the present disclosure have found the issues above. Here, the background art described above does not limit a field to which the present disclosure is applied and is merely an example of the field to which the present disclosure is applied.

It is thus desired to provide an image information reception apparatus and an image information transmission apparatus that are capable of effectively using a bandwidth of a communication network and responding even to changes in an environment of the communication network, and a program and a method that are used therein.

Furthermore, it is desired to provide an image information reception apparatus and an image information transmission apparatus that are capable of increasing a transmission rate of image information when current bandwidth is ample, and a program and a method that are used therein.

A first exemplary embodiment of the present disclosure provides an image information reception apparatus that includes: a receiving unit that receives image information from an image information transmission apparatus through a communication network; a packet analyzing unit that determines an actual reception variation that is based on variations in a reception interval of packets that are included in the image information; and a transmission rate change processing unit that performs a process to increase a target transmission rate of the image information transmission apparatus in response to the actual reception variation being greater than a predetermined value.

A second exemplary embodiment of the present disclosure provides an image information transmission apparatus that includes an encoding unit that generates image information by encoding an image that is captured by an imaging apparatus; a packet analyzing unit that determines an actual transmission variation from a difference in data amount between an I frame, and a P frame or a B frame of the image information; and a transmitting unit that transmits the image information and the actual transmission variation to the image information reception apparatus.

A third exemplary embodiment of the present disclosure provides an image information transmission apparatus includes: an encoding unit that generates image information by encoding an image that is captured by an imaging apparatus; an actual transmission rate detecting unit that detects an actual transmission rate that is a speed at which the image information is actually transmitted; a difference detecting unit that detects a difference between a target transmission rate that is a target value of the speed at which the image information is transmitted and the actual transmission rate; and a transmitting unit that transmits the image information to the image information reception apparatus. The transmitting unit transmits the actual transmission rate to the image information reception apparatus in response to the difference being greater than a predetermined value.

A fourth exemplary embodiment of the present disclosure provides an image information reception method that includes: receiving image information from an image information transmission apparatus through a communication network; determining an actual reception variation that is based on variations in a reception interval of packets that are included in the image information; and performing a process to increase a target transmission rate of the image information transmission apparatus in response to the actual reception variation being greater than a predetermined value.

A fifth exemplary embodiment of the present disclosure provides a non-transitory computer-readable storage medium storing therein an image information reception program that is implemented by a computer, the image information reception program causing the computer to implement: receiving image information from an image information transmission apparatus through a communication network; determining an actual reception variation that is based on variations in a reception interval of packets that are included in the image information; and performing a process to increase a target transmission rate of the image information transmission apparatus in response to the actual reception variation being greater than a predetermined value.

A sixth exemplary embodiment of the present disclosure provides an image information transmission method that includes: generating image information by encoding an image that is captured by an imaging apparatus; determining an actual transmission variation based on a difference in data amount between an I frame, and a P frame or a B frame of the image information; and transmitting the image information and the actual transmission variation to the image information reception apparatus.

A seventh exemplary embodiment of the present disclosure provides a non-transitory computer-readable storage medium storing therein an image information transmission program that is implemented by a computer, the image information transmission program causing the computer to implement: generating image information by encoding an image that is captured by an imaging apparatus; determining an actual transmission variation based on a difference in data amount between an I frame, and a P frame or a B frame of the image information; and transmitting the image information and the actual transmission variation to the image information reception apparatus.

A eighth exemplary embodiment of the present disclosure provides an image information transmission method that includes: generating image information by encoding an image that is captured by an imaging apparatus; detecting an actual transmission rate that is a speed at which the image information is actually transmitted; detecting a difference between a target transmission rate that is a target value of the speed at which the image information is transmitted and the actual transmission rate; and transmitting the image information to the image information reception apparatus, and transmitting the actual transmission rate to the image information reception apparatus in response to the difference being greater than a predetermined value.

A ninth exemplary embodiment of the present disclosure provides a non-transitory computer-readable storage medium storing therein an image information transmission program that is implemented by a computer, the image information transmission program causing the computer to implement: generating image information by encoding an image that is captured by an imaging apparatus; detecting an actual transmission rate that is a speed at which the image information is actually transmitted; detecting a difference between a target transmission rate that is a target value of the speed at which the image information is transmitted and the actual transmission rate; and transmitting the image information to the image information reception apparatus, and transmitting the actual transmission rate to the image information reception apparatus in response to the difference being greater than a predetermined value.

Here, numbers within parentheses that are attached to constituent elements of the disclosure cited in the scope of claims indicate corresponding relationships between the present disclosure and embodiments described hereafter and are not intended to limit the present disclosure.

As a result of the above-described configuration, an image information reception apparatus, an image information transmission apparatus, as well as methods and programs executed in these apparatuses that are exemplary embodiments of the present disclosure are capable of effectively using a bandwidth of a communication network because test data is not used, and are capable of responding even to environmental changes in the communication network because an actual reception variation that is based on variations in a reception interval of packets is used as information that indicates a reception state of the image information. In addition, when the actual reception variation is present, whether the current bandwidth is sufficient can be evaluated. Therefore, a transmission rate of the image information can be increased.

Configurations, functions, and operations of an image information reception apparatus and an image information transmission apparatus of the present disclosure will be described with reference to the drawings.

Here, the present disclosure described below refers to a disclosure that is recited in the scope of claims and is not limited to the embodiments below. In addition, at least phrases within double quotations refer to phrases that are recited in the scope of claims and are similarly not limited to the embodiments below.

Configurations and methods that are recited in a dependent claim in the scope of claims are arbitrary configurations and methods of a disclosure that is recited in an independent claim in the scope of claims. Configurations and methods according to embodiments that correspond to the configurations and methods in the dependent claims, as well as configurations and methods that are not recited in the scope of claims and are only described in the embodiments are arbitrary configurations and methods of the present disclosure. Configurations and methods that are described in the embodiments in cases in which the recitations in the scope of claims are broader than the descriptions according to the embodiments are also arbitrary configurations and methods of the present disclosure in that the configurations and methods are examples of configurations and methods of the present disclosure. In any case, configurations and methods become requisite configurations and methods of the present disclosure by being recited in the independent claims of the scope of claims.

Effects that are described according to the embodiments are effects that are obtained when the configurations according to the embodiments that serve as examples of the present disclosure are provided, and are not necessarily effects that are obtained by the present disclosure.

When a plurality of embodiments are provided, a configuration that is disclosed according to an embodiment is not closed in the embodiment but can be combined across the embodiments. For example, a configuration that is disclosed according to one embodiment may be combined with another embodiment. In addition, configurations that are disclosed according to the plurality of embodiments may be collected and combined.

Matters that are described in the present disclosure are not publicly known issues, but rather issues that have been independently found by the inventors of the present disclosure. These issues, together with the configurations and methods of the present disclosure, are facts that affirm the inventive step of the disclosure.

1. Common Configuration Across Embodiments (Configuration of a Communication System)

As shown in FIG. 1, a communication system 1 is composed of an image information transmission apparatus 200 that is mounted in a vehicle (corresponding to a moving body), an image information reception apparatus 100, and a communication network 2 that is used for communication between the image information transmission apparatus 200 and the image information reception apparatus 100.

Here, the moving body refers to an object that is capable of movement. Movement speed is arbitrary. In addition, the moving body, of course, also includes when the moving body is stopped. For example, the moving body may include an automobile, a motorcycle, a bicycle, a pedestrian, a ship, an airplane, and objects that are mounted therein, and is not limited thereto. Furthermore, "mounted" also includes, in addition to being directly fixed to the moving body, moving together with the moving body while not being fixed to the moving body. For example, being held by a person who is on the moving body, or being mounted in a load that is placed on the moving body may be included.

The image information transmission apparatus 200 (corresponding to an image information transmission apparatus) generates image information by encoding an image that is captured by an imaging apparatus (not shown) and transmits the image information to the image information reception apparatus 100 (corresponding to an image information reception apparatus) over an uplink of the communication network 2. The image information reception apparatus 100 receives the transmitted image information.

In addition, the image information reception apparatus 100 generates required data and instructions based on the received image information, and transmits the data and instructions to the image information transmission apparatus 200 over a downlink of the communication network 2. The image information transmission apparatus 200 receives the transmitted data and instructions. For example, a vehicle monitoring apparatus and an autonomous driving assistance service apparatus may be included as application examples of the image information reception apparatus 100.

Here, the image information transmission apparatus is merely required to be an apparatus that transmits the image information. The image transmission apparatus includes both of when the image information is generated and transmitted by the apparatus, and when the image information is acquired and transmitted by the apparatus. For example, the image information transmission apparatus may correspond to an apparatus that is commonly referred to as a transmission apparatus or a transmission terminal apparatus. Specifically, the image information transmission apparatus may include an electronic control unit (ECU), a semiconductor circuit element, a personal computer (PC), a smartphone, a mobile phone, a video camera, a still camera, and the like.

The image information reception apparatus is merely required to be an apparatus that receives the image information. For example, the image information reception apparatus may correspond to an apparatus that is commonly referred to as a server apparatus, a reception apparatus, or a reception terminal apparatus. Specifically, the image information reception apparatus may include various types of server apparatuses, a workstation, and a PC. However, the image information reception apparatus may also be an ECU, a semiconductor circuit element, a smartphone, a mobile phone, or the like.

The imaging apparatus includes, in addition to being outside the image information transmission apparatus, being included in the image information transmission apparatus and integrated with the image information transmission apparatus.

The communication network 2 (corresponding to a communication network) uses a wireless communication method between the image information transmission apparatus 200 and a base station apparatus. For example, as the wireless communication method, IEEE 802.11 (WiFi (registered trademark)), IEEE 802.16 (WiMAX (registered trademark)), Wideband Code Division Multiple Access (W-CDMA), High Speed Packet Access (HSPA), Long Term Evolution (LTE), Long Term Evolution Advanced (LTE-A), 4G, or 5G may be used. In addition, a wired communication method such as a telephone line or the internet is used between the base station apparatus and the image information reception apparatus 100.

In this manner, the communication network 2 that is common across the embodiments is a combination of a plurality of networks. However, use of a single communication network is not excluded. Here, the communication network may be a wired communication network, in addition to the wireless communication network. Furthermore, the communication network may be a combination thereof.

As an example of the communication system 1, the image information transmission apparatus 200 being mounted in a vehicle and the image information reception apparatus 100 being a server that does not move is assumed. However, the communication system 1 is not limited thereto. For example, both of the image information transmission apparatus 200 and the image information reception apparatus 100 may be mounted in differing vehicles. Alternatively, the image information transmission apparatus 200 may be a server and the image information reception apparatus 100 may be mounted in a vehicle.

Alternatively, both of the image information transmission apparatus 200 and the image information reception apparatus 100 may be servers that do not move or computers that do not move. In addition, the image information transmission apparatus 200 is not required to be a computer and, for example, may be a camera for monitoring that is attached to infrastructure.

2. Mechanism of the Present Disclosure that is Common Across the Embodiments

The inventors of the present disclosure have found a following mechanism. An image that is captured by an imaging apparatus is ordinarily converted to image information through use of a compression/encoding technology, such as H.264 or H.265, that is ordinarily referred to as Moving Picture Experts Group (MPEG). A technology that is referred to as inter-frame prediction is used in these compression/encoding technologies.

Inter-frame prediction is a technology for predicting a current frame from a previous frame using a property that a previous frame and a next frame are very similar in a moving image. In compression using inter-frame prediction, only a difference between an input image and a predicted image is required to be encoded. Therefore, a very high compression rate can be obtained. A frame that is encoded without use of inter-frame prediction is referred to as an I frame. A frame that is encoded using inter-frame prediction is referred to as a P frame or a B frame. In addition, an amount of information (that is, size) of the I frame is generally significantly greater than an amount of information (that is, size) of the P frame or the B frame. Therefore, a number of packets for transmitting the I frame can be said to be greater than a number of packets for transmitting the P frame or the B frame.

FIG. 2A shows an aspect of frames that are obtained by an image being compressed/encoded. Here, to simplify the description, the B frame is not used in the description. When an image is compressed/encoded, for example, when frames are outputted at 30 frames/second, a length between frames may be 1/30 of a second. Here, the number of packets that are required to transmit these frames is five in the case of the I frame and two in the case of the P frame.

Transmission of the packets of the image information is successively performed after awaiting reception response from the image information reception apparatus 100. Therefore, transmission of a single packet requires more time as the communication bandwidth becomes narrower.

In cases in which the communication bandwidth is ample, when the image information of an image that is captured is transmitted in real time, as shown in FIG. 2B, a blank period occurs from when the transmission of the packets of the I frame is ended until the next transmission of the packets of the P frame is started. This similarly applies from when the transmission of the packets of the P frame is ended until the next transmission of the packets of the P frame is started. In this manner, when the communication bandwidth is ample, variations occur in a transmission interval of the packets.

In contrast, when the communication bandwidth is not ample, as shown in FIG. 2C, the transmission of the packets of the P frame is started immediately after the transmission of the packets of the I frame is ended. This also similarly applies from when the transmission of the packets of the P frame is ended until the next transmission of the packets of the P frame is started. In this manner, when the communication bandwidth is not ample, the transmission interval of the packets is fixed, and the transmission interval of the packets become longer as the communication bandwidth becomes less ample. In accompaniment, transmitting the image information in real time becomes difficult.

Figure 3:
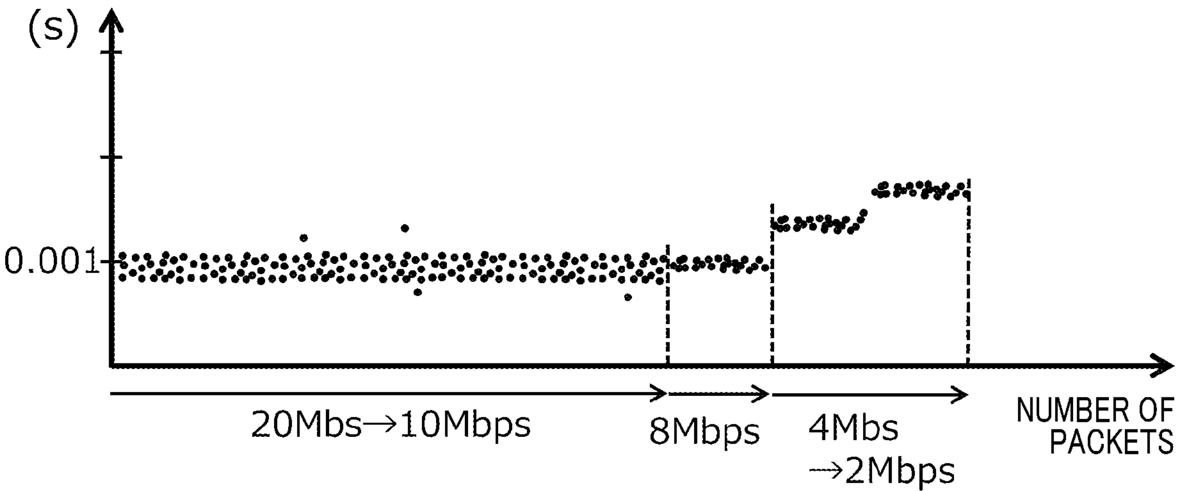
FIG. 3 is an explanatory diagram illustrating a relationship between a communication bandwidth and a packet reception interval that is common across the embodiments of the present disclosure.

FIG. 3 shows changes in a packet reception interval when the communication bandwidth of the communication network 2 is changed. The image information is transmitted from the image information transmission apparatus 200 at a target transmission rate of 8 Megabits per second (Mbps), and the communication bandwidth of the communication network 2 is degraded in stages at every 2 Mbps, from 20 Mbps to 2 Mbps.

During a period in which the communication bandwidth is from 20 Mbps to 10 Mbps, variations occur in the reception interval of the packets centered around 0.001 s. Because the communication bandwidth is wider than the target transmission rate during this period, it is clear that variations occur in the reception interval when the communication bandwidth is ample. In this case, because the communication bandwidth is ample, the target transmission rate can be increased.

When the communication bandwidth is 8 Mbps, variations in the reception interval of the packets centered around 0.001 s are hardly seen. Because the target transmission rate and the communication bandwidth are identical during this period, variations in the reception interval do not occur when the communication bandwidth is used for communication close to its limit.

During a period in which the communication bandwidth is from 4 Mbps to 2 Mbps, the reception interval of the packets increases in stages. Because there is not enough communication bandwidth to cover the target communication rate during this period, it is clear that transmission of the packets take time when the communication bandwidth is not ample and the reception interval of the packets widen. In this case, because the communication bandwidth is not ample, the target transmission rate is required to be decreased.

By taking advantage of the property described above, whether the communication bandwidth is ample can be detected by the variations in the reception interval of the packets being determined. In addition, because the communication bandwidth can be said to be ample when variations are present in the reception interval of the packets, the target transmission rate can be increased. Furthermore, because the communication bandwidth can be said to not be ample when variations are not present in the reception interval of the packets, the target transmission rate is required to be decreased.

Here, because there is range in a data amount of each frame even when the compression/encoding technology that does not use inter-frame prediction is used, variations occur in the transmission interval of the packets. Therefore, the mechanism of the present disclosure is applicable even when the compression/encoding technology that does not use inter-frame prediction is used. For example, Motion Joint Photographic Experts Group (Motion JPEG or M-JPEG or MJPEG) may be used.

3. First Embodiment (1) Configuration of the Image Information Reception Apparatus 100

Figure 4:
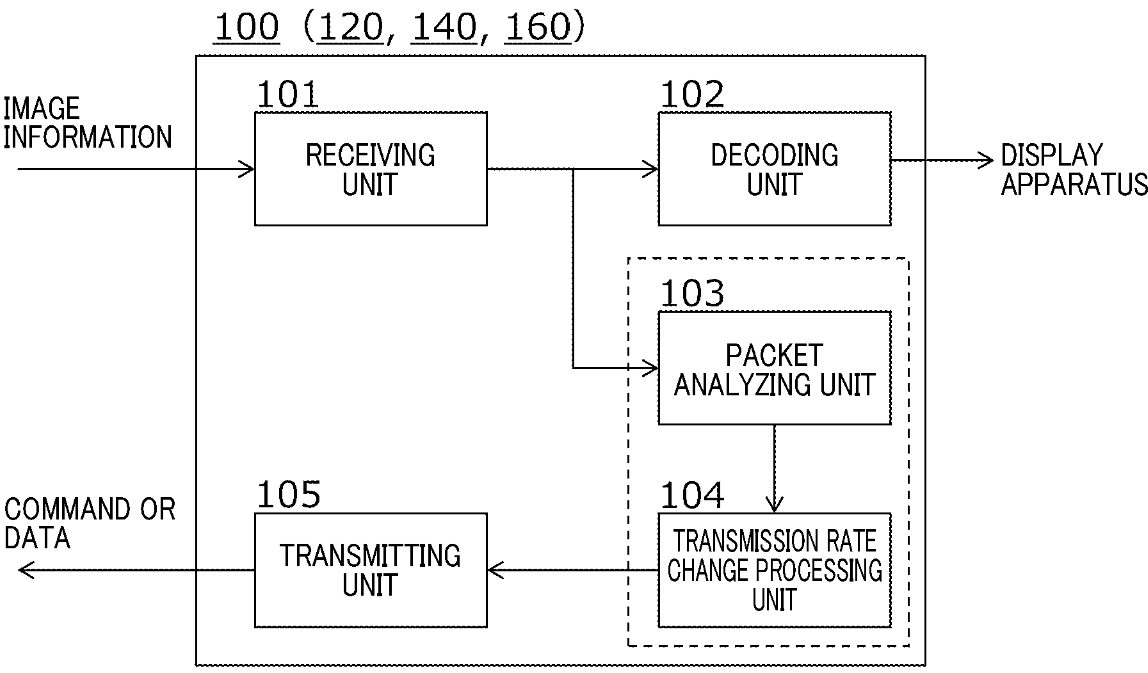
FIG. 4 is a configuration diagram illustrating an image information reception apparatus according to first to fourth embodiments of the present disclosure.

As shown in FIG. 4, the image information reception apparatus 100 includes a receiving unit 101, a decoding unit 102, a packet analyzing unit 103, a transmission rate change processing unit 104, and a transmitting unit 105.

The receiving unit 101 receives image information from the image information transmission apparatus 200 through the communication network 2. In the image information, preferably, an image is encoded using inter-frame prediction in the image information transmission apparatus 200 or an apparatus that is connected to the image information transmission apparatus 200. However, the image may be encoded by a method that does not use inter-frame prediction. For example, in the image information, the image may be encoded using Motion JPEG. Here, the image includes either of a moving image and a still image. In addition, the image may include both a moving image and a still image.

The decoding unit 102 decodes the image information that is received by the receiving unit 101 and outputs the decoded image information to a display apparatus. The packet analyzing unit 103 detects the reception interval of the packets that are included in the image information received by the receiving unit 101 and determines an actual reception variation that is based on the variation in the reception interval of the packets. The actual reception variation can be quantified by dispersion being determined. The dispersion is preferably sample variance but is not limited thereto. In addition, as the actual reception variation, a maximum value and a minimum value of the reception intervals of the packets per fixed amount of time may be used.

Here, variation refers to a state in which or an extent by which the reception intervals are discrete. For example, the variation can be expressed by an index such as dispersion, maximum value/minimum value, amplitude, standard deviation, or the like.

The transmission rate change processing unit 104 compares the actual reception variation that is determined by the packet analyzing unit 103 and a predetermined value. When the actual reception variation is greater than the predetermined value, the transmission rate change processing unit 104 performs a process to increase the target transmission rate that is a transmission rate at which the image information is transmitted from the image information transmission apparatus 200. The target transmission rate refers to a target value of a speed at which the image information transmission apparatus 200 transmits the image information. The target transmission rate is also referred to as a target bit rate.

As an example, the transmitting unit 105, described hereafter, transmitting a command to increase the target transmission rate to the image information transmission apparatus 200 may be included. If a step of the transmission rate is defined between the image information transmission apparatus 200 and the image information reception apparatus 100, when the command to increase the target transmission rate is transmitted, the target transmission rate is increased by an amount amounting to the defined step from a current target transmission rate. For example, a case in which the step is 1 Mbps and the current target transmission rate is 2 Mbps may be assumed. When the command to increase the target transmission rate is transmitted from the image information reception apparatus 100 to the image information transmission apparatus 200, the image information transmission apparatus 200 that receives this command increases the target transmission rate that is 2 Mbps to 3 Mbps.

As another example, data that indicates a value of the target transmission rate being transmitted may be included. For example, when the target transmission rate is increased to 4 Mbps, data that indicates a value of 3 Mbps may be transmitted from the image information reception apparatus 100 to the image information transmission apparatus 200.

In addition, a number of frames (frames per second (fps)) or resolution may be transmitted. The image information transmission apparatus 200 that receives these values sets the target transmission rate that corresponds to these values.

For example, the predetermined value may set a dispersion value to a fixed value of 0.01. Alternatively, for example, the dispersion value that is set may be increased based on the vehicle speed, because variations in a communication environment increase as a vehicle speed of the vehicle in which the image information transmission apparatus 200 is mounted increases. In this case, the image information transmission apparatus 200 transmits the vehicle speed to the image information reception apparatus 100, together with the image information. In addition, the dispersion value may be switched between that for urban areas and that for suburban areas through use of road information.

An upper limit value of the target transmission rate may be switched based on a type of image information that is transmitted. For example, when a full-high definition (HD)

video is transmitted, the upper limit value may be 8 Mbps. When a 4K video is transmitted, the upper limit value may be 40 Mbps.

Here, the predetermined value includes a variable that varies depending on conditions, in addition to a fixed value. Furthermore, in addition to a numeric value, a case in which the predetermined value is expressed by a plurality of sets by quantization is also included. Where ranges are described, they may or may not include boundary values. The transmission rate refers to an amount of transmission information per unit time. Increase transmission rate includes cases in which the amount of transmission information per unit time is indirectly increased by the compression rate being increased or multi-value modulation being used, in addition to a case in which the amount of transmission information is directly increased.

The transmitting unit 105 transmits the command or the data that indicates the value of the target transmission rate that is generated by the transmission rate change processing unit 104 to the image information transmission apparatus 200.

As the image information reception apparatus 100, a server, a workstation, or a PC can be used as an assumed aspect. In this case, the image information reception apparatus 100 may include a display apparatus in addition to the configuration shown in FIG. 4. In addition, the image information reception apparatus 100 may be physically configured by a plurality of servers or the like. In this case, the plurality of servers collectively form the image information reception apparatus 100.

As another assumed aspect, the image information reception apparatus 100 may be a smartphone or a mobile phone that is a finished product, an ECU that is a half-finished product, or a semiconductor circuit element that is a component. In this case, the image information reception apparatus 100 may be mounted in a vehicle (corresponding to a second moving body) that differs from the vehicle (corresponding to a first moving body) in which the image information transmission apparatus 200 is mounted. That is, the present communication system 1 can be used for vehicle-to-vehicle communication.

In particular, when the image information communication apparatus 100 is configured by the semiconductor circuit element, it is sufficient to provide the packet analyzing unit 103 and the transmission rate change processing unit 104, as indicated by a broken line in FIG. 4. In this case, an input portion of the packet analyzing unit 103 configures a receiving unit. In addition, an output portion of the transmission rate change processing unit 104 configures a transmitting unit.

(2) Configuration of the Image Information Transmission Apparatus 200

Figure 5:
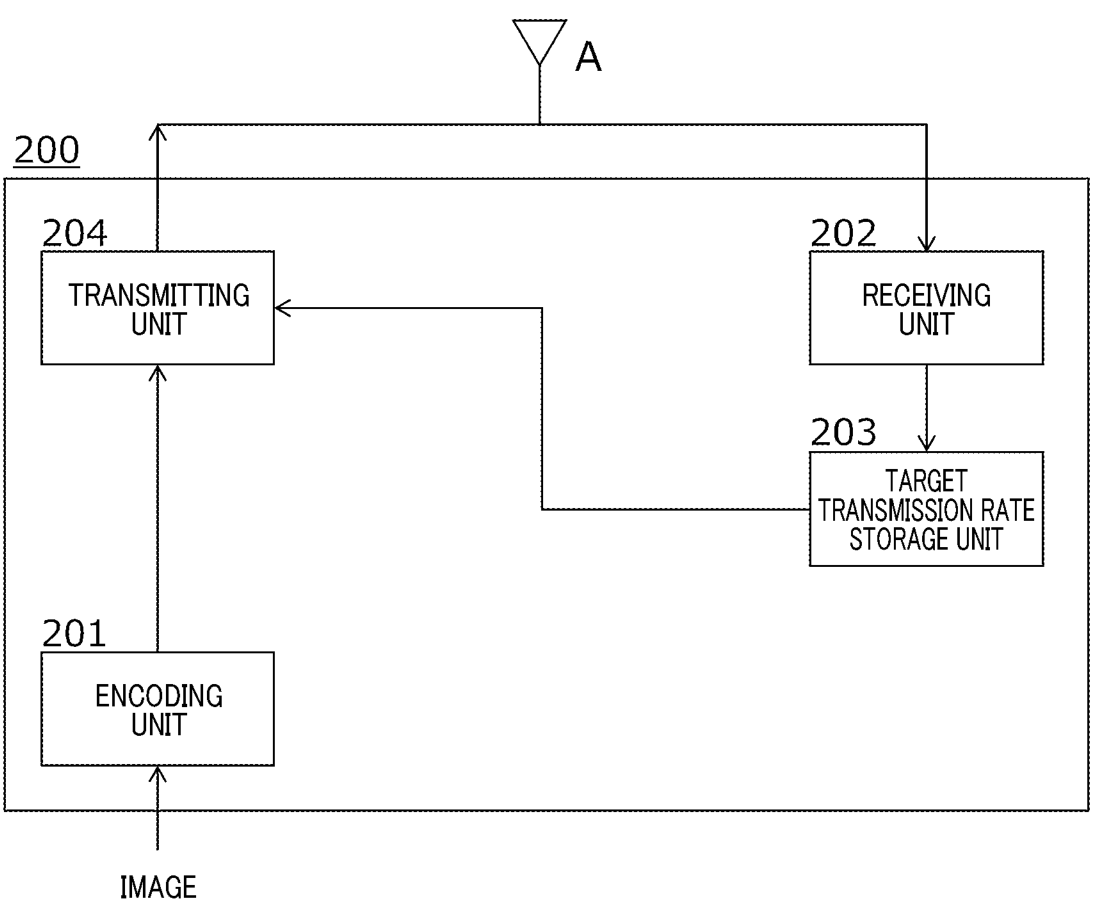
FIG. 5 is a configuration diagram illustrating an image information transmission apparatus according to the first embodiment of the present disclosure.

As shown in FIG. 5, the image information transmission apparatus 200 includes an encoding unit 201, a receiving unit 202, a target transmission rate storage unit 203, and a transmitting unit 204. In addition, the receiving unit 202 and the transmitting unit 204 are connected to an antenna A when the communication network 2 uses a wireless communication method, and transmit and receive image information, commands, data, and the like through the antenna A.

The encoding unit 201 generates the image information by encoding an image that is captured by a video camera or the like (corresponding to an imaging apparatus). For encoding, a compression/encoding technology that includes inter-frame prediction, such as H.264 or H.265, that is ordinarily referred to as MPEG is preferably used. That said, encoding is merely required to be a compression method in which variations in the reception interval occur in the image information communication apparatus 100 and need not necessarily include inter-frame prediction. For example, encoding may be Motion JPEG.

The receiving unit 202 receives the command to increase the target transmission rate or the data that indicates the value of the target transmission rate that is transmitted from the transmitting unit 105 of the image information reception apparatus 100 through the antenna A.

The target transmission rate storage unit 203 stores the value of the target transmission rate that is indicated by the data received by the receiving unit 202. Here, when the receiving unit 202 receives the command to increase the target transmission rate, a specific target transmission rate may be generated and stored on the image information transmission apparatus 200 side based on the command.

The transmitting unit 204 reads the target transmission rate from the target transmission rate storage unit 203 and transmits the image information that is outputted from the encoding unit 201 to the image information reception apparatus 100 at the target transmission rate, through the antenna A.

Here, a buffer unit may be provided at an earlier stage from the transmitting unit 204, and the image information that is generated by the encoding unit 201 may be temporarily stored. In this case, the transmitting unit 204 reads the image information that is stored in the buffer unit and transmits the image information to the image information reception apparatus 100.

(3) Operations of the Image Information Reception Apparatus 100 and the Image Information Transmission Apparatus 200

Operations of the image information reception apparatus 100 will be described with reference to a flowchart in FIG. 6.

At step S101, the receiving unit 101 receives the image information from the image information transmission apparatus 200 through the communication network 2. At step S102, the packet analyzing unit 103 detects the reception intervals of the packets that are included in the image information received by the receiving unit 101 and determines the actual reception variation.

At step S103, the transmission rate change processing unit 104 compares the actual reception variation determined by the packet analyzing unit 103 and the predetermined value. When the actual reception variation is greater than the predetermined value, step S104 is performed. When the actual reception variation is equal to or less than the predetermined value, the process is ended.

At step S104, the transmitting unit 105 transmits the data that indicates the value of the target transmission rate or the command to increase the target transmission rate generated by the transmission rate change processing unit 104 to the image information transmission apparatus 200, and ends the process.

Operations of the image information transmission apparatus 200 will be described with reference to a flowchart in FIG. 7.

At step S201, the encoding unit 201 encodes an image that is captured by a video camera or the like, and generates the image information. At step S202, the receiving unit 202 receives the data of the value that indicates the target transmission rate or the command to increase the target transmission rate that is transmitted from the transmitting unit 105 of the image information reception apparatus 100 through the antenna A.

At step S203, the target transmission rate storage unit 203 stores the value of the target transmission rate that is indicated by the data received by the receiving unit 202. When the command to increase the target transmission rate is received, the target transmission rate is updated and stored. At step S204, the transmitting unit 204 reads the target transmission rate from the target transmission rate storage unit 203 and transmits the image information outputted from the encoding unit 201 at the target transmission rate, through the antenna A.

The above-described operations indicate not only an image information reception method of the image information reception apparatus 100 but also processing steps of an image information reception program that is run by the image information reception apparatus 100. In addition, the above-described operations indicate not only an image information transmission method of the image information transmission apparatus 200 but also processing steps of an image information transmission program that is run by the image information transmission apparatus 200.

Figure 6:
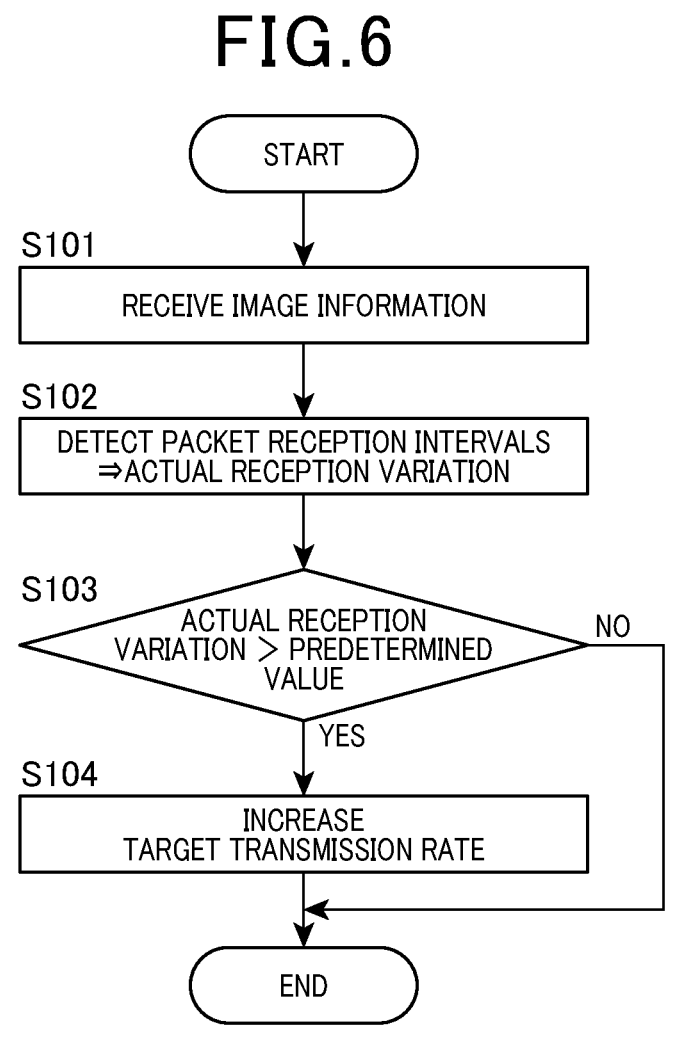
Figure 7:
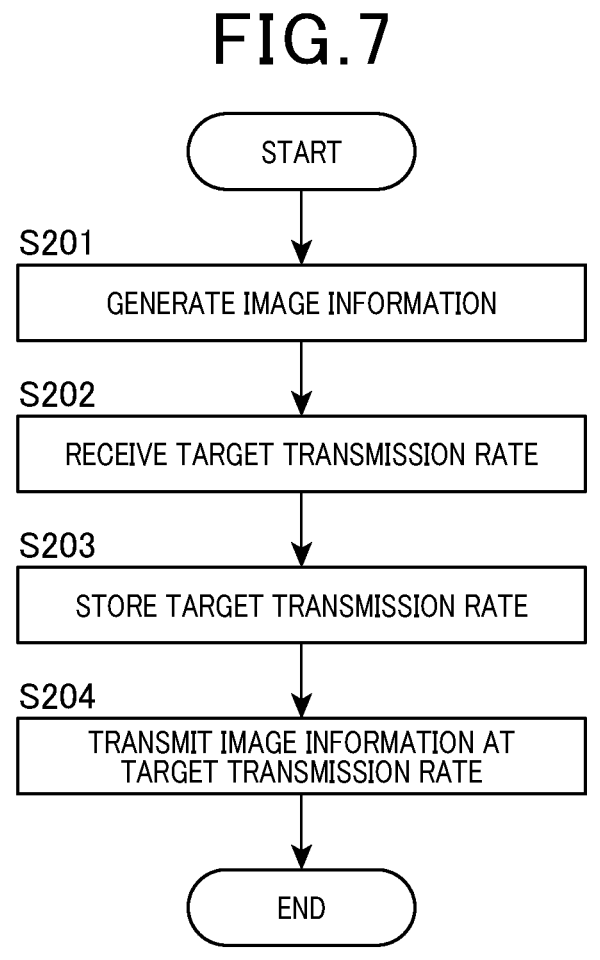

In addition, these processes are not limited to the order shown in FIGS. 6 and 7. That is, the order may be interchanged as long as constraints, such as a relationship in which a certain step uses a result from a previous step, are not present.

The foregoing points also similarly apply to flowcharts according to second and subsequent embodiments.

(4) Effects

As described above, according to the first embodiment, the target transmission rate at which the communication bandwidth can be effectively used can be set by the communication bandwidth being estimated based on the actual reception variation.

4. Second Embodiment

According to the first embodiment, the communication bandwidth of the communication network is estimated using the actual reception variation. However, the variations in the reception interval may be attributed to the communication network being unstable.

Therefore, according to the present embodiment, a configuration for excluding cases that are attributed to the communication network being unstable is added to the first embodiment.

(1) Configuration of an Image Information Reception Apparatus 120

A configuration of an image information reception apparatus 120 according to the present embodiment is identical to the configuration of the image information reception apparatus 100 according to the first embodiment shown in FIG. 4. Therefore, FIG. 4 is cited in the description.

The image reception apparatus 120 according to the present embodiment is identical to that according to the first embodiment, other than processing content of the transmission rate change processing unit 104 differing. Regarding configurations that are similar to those according to the first embodiment, the descriptions according to the first embodiment are cited. Descriptions thereof are omitted.

Before the processes described according to the first embodiment, the transmission rate change processing unit 104 determines whether the actual reception variation that is determined by the packet analyzing unit 103 is attributed to a difference in data amount between the I frame, and the P frame or the B frame determined by inter-frame prediction. Then, when the actual reception variation is determined to be attributed to the difference in data amount, whether the process to increase the target transmission rate is performed is determined by the processes of the transmission rate change processing unit 104 described according to the first embodiment being subsequently performed.

In contrast, when the actual reception variation is determined to not be attributed to the difference in data amount, the process to increase the target transmission rate is not performed because the variations in the reception interval are considered to be attributed to instability in the communication network.

An example of a specific determination method of the transmission rate change processing unit 104 will be described.

A standard variation that is determined from the difference in data amount between the I frame, and the P frame or the B frame determined by a standard image being encoded when the image information is transmitted at a standard target transmission rate is determined in advance. The standard variation refers to variations in the transmission interval of the packets when the image information is transmitted at the standard target transmission rate. Then, the standard variation and the actual reception variation that is determined by the packet analyzing unit 103 are compared, and whether the actual reception variation is attributed to the difference in data amount between the I frame, and the P frame or the B frame is determined based on whether similarity with a waveform or dispersion of the standard variation is present.

Here, as the standard target transmission rate, a target transmission rate that is set as default may be used. In addition, standard variations may be respectively determined using several target transmission rates, and the standard variation that corresponds to the actual target transmission rate that is set in the image information transmission apparatus may be used.

For example, as the standard image, a moving image in which an area ahead is captured during travel through an urban area may be used as a sample. In addition, standard variations may be respectively prepared using moving images that are captured at several locations that have differing surrounding environments, such as a rural area and an expressway. The surrounding environment of a location in which the vehicle is currently traveling may be estimated with reference to map information and position information, and the standard variation based on the moving image that is captured in the estimated surrounding environment may be used.

Alternatively, standard variations may be respectively prepared using moving images that are captured at differing times, such as morning, noon, evening, and night, and the standard variation based on the moving image that is captured at a time closest to a current time may be used. Alternatively, standard variations may be respectively prepared using moving images that are captured in differing weathers such as sunny weather, cloudy weather, and rainy weather, and the standard variation based on the moving image that is captured in the weather that is closest to a current weather may be used. The current weather can be estimated using a raindrop sensor or a sunshine recorder. Here, a standard image that combines a plurality of the foregoing may also be used.

Another example of a specific determination method of the transmission rate change processing unit 104 will be described.

An image information transmission apparatus 220, described hereafter, determines an transmission actual variation based on the difference in data amount between the I frame, and the P frame or the B frame of the image information generated by the image information transmission apparatus 220. The actual transmission variation refers to variations in the transmission interval of the packets when the image information that is transmitted from the image information transmission apparatus 220 is transmitted at the target transmission rate.

Then, the actual transmission variation is transmitted from the image information transmission apparatus 220 and received by the receiving unit 101 of the image information reception apparatus 100. The transmission rate change processing unit 104 then compares the received transmission actual variation and the actual reception variation that is actually determined by the packet analyzing unit 103, and determines whether the actual reception variation is attributed to the difference in data amount between the I frame, and the P frame or the B frame based on whether similarity with a waveform or dispersion of the actual transmission variation is present.

(2) Configuration of the Image Information Transmission Apparatus 220

Figure 8:
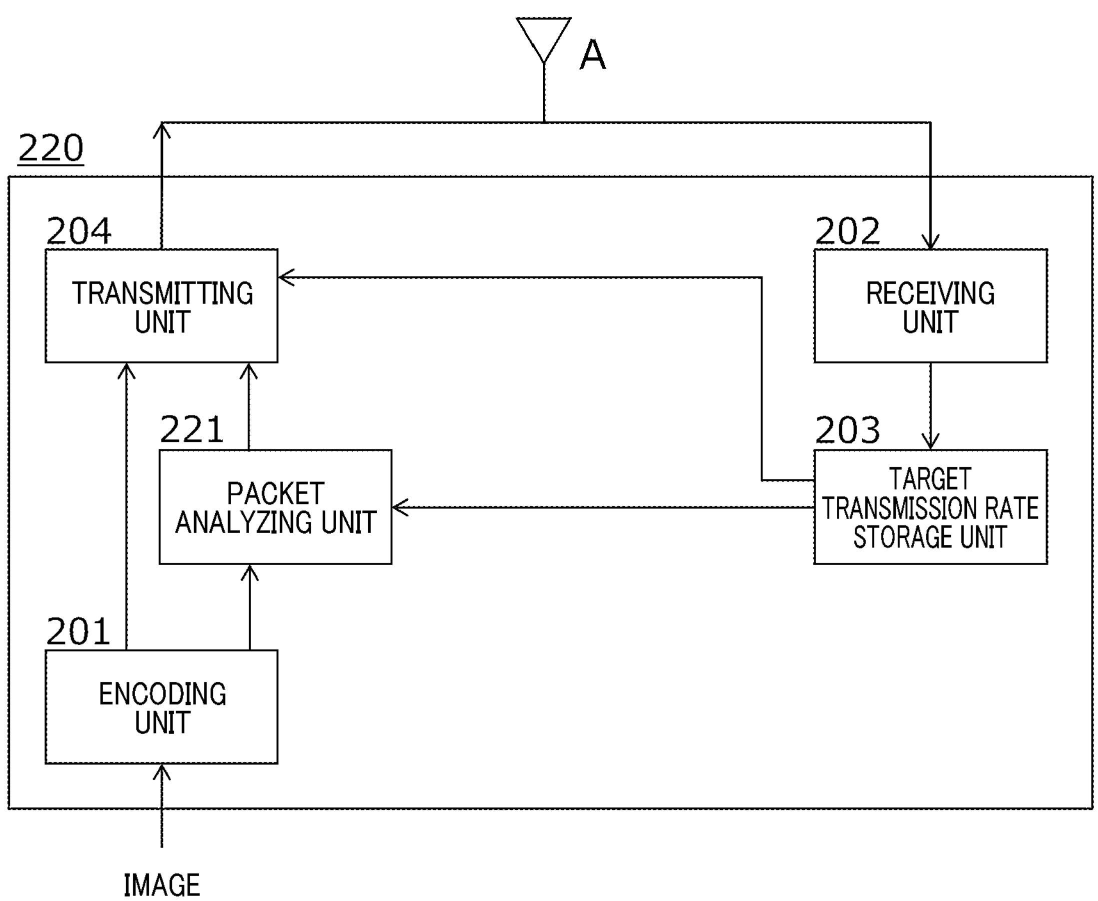
FIG. 8 is a configuration diagram illustrating the image information transmission apparatus according to the second embodiment of the present disclosure.

As shown in FIG. 8, the image information transmission apparatus 220 includes a packet analyzing unit 221 in addition to the configuration of the image information transmission apparatus 200 according to the first embodiment. The image information transmission apparatus 220 is an apparatus that corresponds to the image information reception apparatus 120 that performs the operations described as examples in the specific determination methods of the transmission rate change processing unit 104. Other apparatuses that correspond to the image information reception apparatus 120 are the same as the image information transmission apparatus 200 according to the first embodiment. Therefore, descriptions thereof are omitted.

The packet analyzing unit 221 determines the actual transmission variation from the difference in data amount between the I frame, and the P frame or the B frame that are included in the image information generated by the encoding unit 201 based on the target transmission rate that is stored in the target transmission rate storage unit 203. The actual transmission variation can also be quantified by dispersion being determined. The dispersion is preferably sample variance but is not limited thereto. In addition, as the actual transmission variation, a maximum value and a minimum value of the transmission intervals of the packets per fixed amount of time may be used. The actual transmission variation that is determined by the packet analyzing unit 221 is transmitted from the transmitting unit 204 to the image information reception apparatus 100.

(3) Operations of the Image Information Reception Apparatus 120 and the Image Information Transmission Apparatus 220

Figure 9:
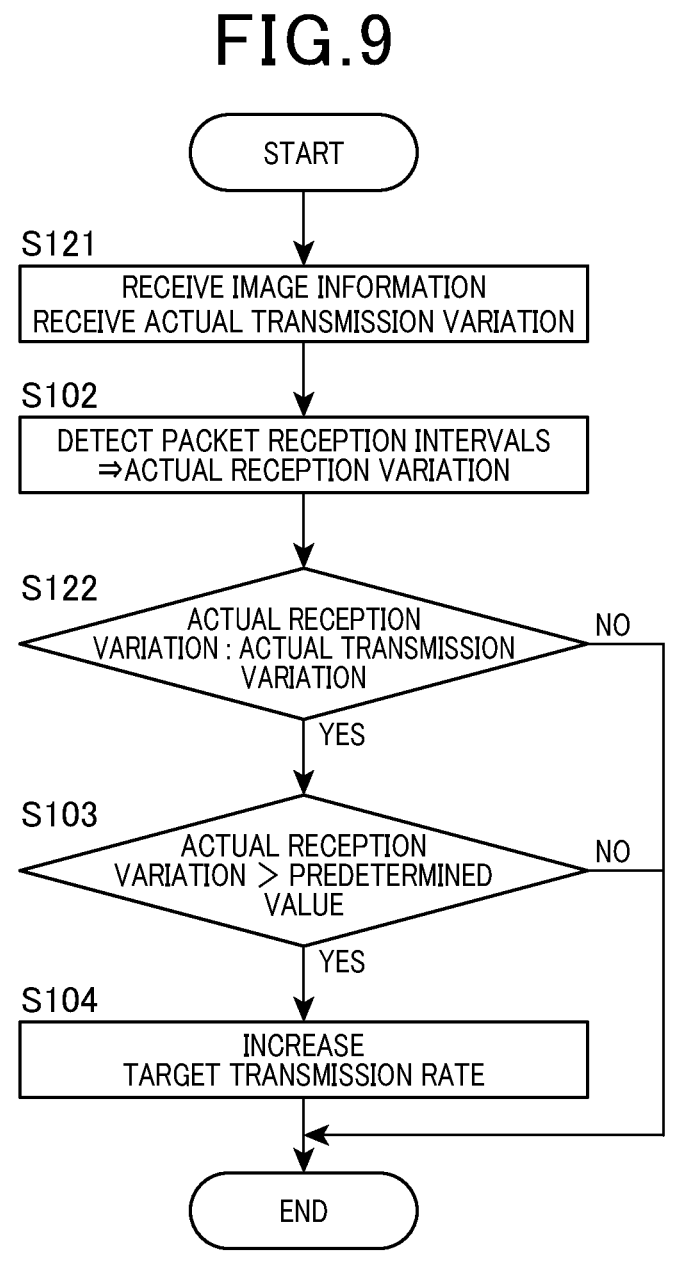

Operations of the image information reception apparatus 120 will be described with reference to a flowchart in FIG. 9. The flowchart in FIG. 9 is the flowchart in FIG. 6 that shows the operations of the image information reception apparatus 100 according to the first embodiment to which step S122 is added. In addition, step S121 is provided instead of step S101. The descriptions with reference to FIG. 6 are cited regarding steps that are common with FIG. 6. Descriptions thereof are omitted.

At step S121, the receiving unit 101 receives the image information from the image information transmission apparatus 220 through the communication network 2. Furthermore, the receiving unit 101 receives the actual transmission variation that is determined from the difference in data amount between the I frame, and the P frame or the B frame of the image information generated by the image information transmission apparatus 220.

At step S122, the transmission rate change processing unit 104 compares the actual transmission variation that is received by the receiving unit 101 and the actual reception variation that is actually determined by the packet analyzing unit 103. The transmission rate change processing unit 104 determines whether the actual reception variation is attributed to the difference in data amount between the I frame, and the P frame or the B frame based on whether similarity with the waveform or dispersion of the actual transmission variation is present. When the actual reception variation is determined to be attributed to the difference in data amount, the process proceeds to step S103. When the actual reception variation is determined to not be attributed to the difference in data amount, the process is ended.

Here, these processes are not limited to the order shown in FIG. 9. That is, the order may be interchanged as long as constraints, such as a relationship in which a certain step uses a result from a previous step, are not present. For example, the order of step S122 and step S103 may be interchanged.

Figure 10:
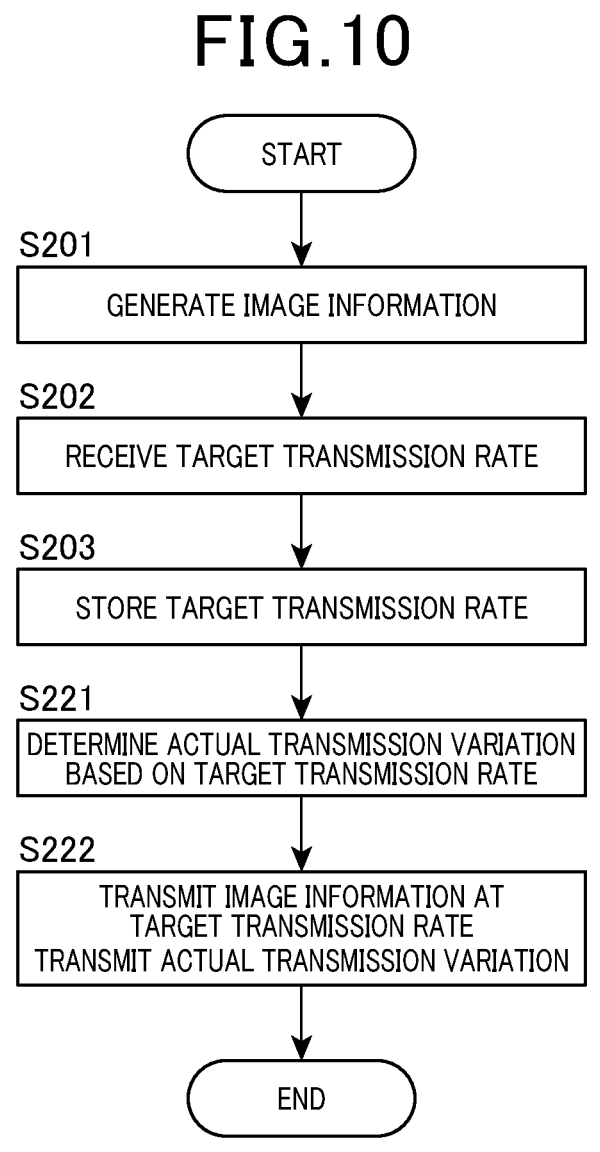

Operations of the image information transmission apparatus 220 will be described with reference to a flowchart in FIG. 10. The flowchart in FIG. 10 is the flowchart in FIG. 7 that shows the operations of the image information transmission apparatus 200 according to the first embodiment to which step S221 is added. In addition, step S222 is provided instead of step S204. The descriptions with reference to FIG. 7 are cited regarding steps that are common with FIG. 7. Descriptions thereof are omitted.

At step S221, the packet analyzing unit 221 determines the actual transmission variation based on the difference in data amount between the I frame, and the P frame or the B frame that are included in the image information generated by the encoding unit 201 based on the target transmission rate that is stored in the target transmission rate storage unit 203.

At step S222, the transmitting unit 204 reads the target transmission rate from the target transmission rate storage unit 203 and transmits the image information and the actual transmission variation that is outputted from the encoding unit 201 at the target transmission rate, through the antenna A.

(4) Effects

As described above, according to the second embodiment, as a result of the cause of the actual reception variation being identified, the actual reception variation that is attributed to instability in the communication network can be excluded from determination. Consequently, a more accurate estimation of the communication bandwidth can be performed.

5. Third Embodiment

According to the first embodiment, the communication bandwidth of the communication network is estimated using the actual reception variation and the process to increase the target transmission rate of the image information transmission apparatus 200 is performed. According to the present embodiment, in addition thereto, a configuration for performing a process to decrease the target transmission rate of the image information transmission apparatus 200 is added.

(1) Configuration of an Image Information Reception Apparatus 140

A configuration of an image information reception apparatus 140 according to the present embodiment is identical to the configuration of the image information reception apparatus 100 according to the first embodiment shown in FIG. 1. Therefore, FIG. 4 is cited in the description.

The image information reception apparatus 140 according to the present embodiment is identical to that according to the first embodiment, other than processing content of the transmission rate change processing unit 104 differing. Regarding configurations that are similar to those according to the first embodiment, the descriptions according to the first embodiment are cited. Descriptions thereof are omitted.

As described in the section regarding the mechanism of the present disclosure, when the actual reception variations are not present in the reception interval of the packets and the reception interval of the packets is wide, it can be said that the communication bandwidth is not ample. Therefore, a process to decrease the target transmission rate is performed by the reception interval of the packets being evaluated with reference to the target transmission rate.

The transmission rate change processing unit 104 references the command to increase the target transmission rate or the data that indicates the value of the target transmission rate that has been generated in the past, and compares the reception interval of the packets detected by the packet analyzing unit 103 and the reception interval of the packets determined from the target transmission rate. When the reception interval of the packets detected by the packet analyzing unit 103 is greater than the reception interval of the packets determined from the target transmission rate, the process to decrease the target transmission rate is performed. In the process to decrease the target transmission rate, a method that is identical to the example of the process to increase the target transmission rate described according to the first embodiment can be used.

Here, "decrease transmission rate" includes cases in which the amount of transmission information per unit time is indirectly decreased by the compression rate being decreased or multi-value modulation being used, in addition to a case in which the amount of transmission information is directly decreased.

For example, when the target transmission rate is 1 Mbps and a packet size is 1000 Bytes (8000 bits), the reception interval of the packets determined from the target transmission rate may be 8000 bits/1 Mbps=8 ms. In contrast, when the reception interval of the packets detected by the packet detecting unit 103 is 10 ms, the reception interval of the packets detected by the packet analyzing unit 103 may be evaluated as being greater than the reception interval of the packets determined from the target transmission rate. A command to decrease the target transmission rate or data that indicates a specific value of the target transmission rate is transmitted to the image information transmission apparatus 200.

An apparatus that corresponds to the image information reception apparatus 140 is the same as the image information transmission apparatus 200 according to the first embodiment. Descriptions thereof are omitted.

(2) Operations of the Image Information Reception Apparatus 140

Figure 11:
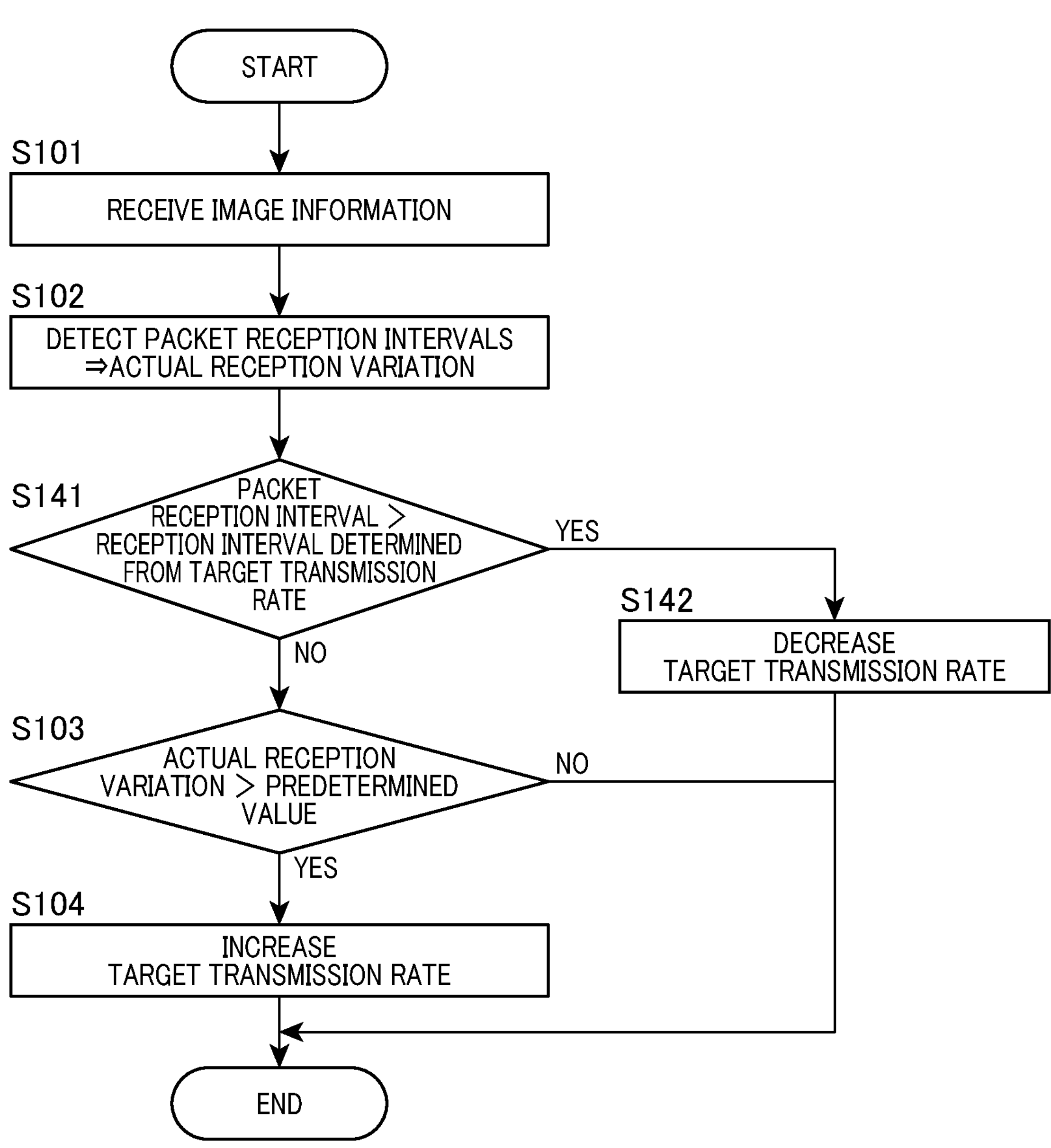
FIG. 11 is a flowchart illustrating operations of the image information reception apparatus according to the third embodiment of the present disclosure.

Operations of the image information reception apparatus 140 will be described with reference to a flowchart in FIG. 11. The flowchart in FIG. 11 is the flowchart in FIG. 6 that shows the operations of the image information reception apparatus 100 according to the first embodiment to which step S141 and step S142 are added. The descriptions with reference to FIG. 6 are cited regarding steps that are common with FIG. 6. Descriptions thereof are omitted.

At step S141, the transmission rate change processing unit 104 references the command to increase the target transmission rate or the data that indicates the value of the target transmission rate that have been generated in the past, and compares the reception interval of the packets detected by the packet analyzing unit 103 and the reception interval of the packets determined from the target transmission rate.

When the reception interval of the packets detected by the packet analyzing unit 103 is greater than the reception interval of the packets determined from the target transmission rate, at step S142, a process to decrease the target transmission rate is performed. When the reception interval of the packets detected by the packet analyzing unit 103 is equal to or less than the reception interval of the packets determined from the target transmission rate, the process proceeds to step S103.

(3) Effects

As described above, according to the third embodiment, the process to decrease the target transmission rate can be performed, in addition to the process to increase the target transmission rate. The target transmission rate at which the communication bandwidth can be effectively used can be set.

6. Fourth Embodiment

According to the third embodiment, the actual reception interval of the packets that is detected by the packet analyzing unit 103 is evaluated with reference to the reception interval of the packets that is determined from the target transmission rate. However, a difference may occur between the target transmission rate and an actual transmission rate based on a state on the image information transmission apparatus 200 side, such as when the image information transmission apparatus 200 is mounted in a vehicle and movement in the image that is captured by the imaging apparatus is fast, such as during a right turn or travel on an expressway. According to the present embodiment, a configuration that appropriately performs the process to decrease the target transmission rate even in such cases is added.

(1) Configuration of an Image Information Reception Apparatus 160

A configuration of an image information reception apparatus 160 according to the present embodiment is identical to the configuration of the image information reception apparatus 100 according to the first embodiment shown in FIG. 1. Therefore, FIG. 4 is cited in the description.

The image information reception apparatus 160 according to the present embodiment is identical to that according to the first embodiment, other than processing content of the transmission rate change processing unit 104 differing. Regarding configurations that are similar to those according to the first embodiment, the descriptions according to the first embodiment are cited. Descriptions thereof are omitted.

The receiving unit 101 receives the actual transmission rate that is the transmission rate at which the image information is actually transmitted and that is generated by an image information transmission apparatus 260, described hereafter, from the image information transmission apparatus 260.

The transmission rate change processing unit 104 compares the reception interval of the packets determined from the received actual transmission rate and the reception interval of the packets actually detected by the packet analyzing unit 103. A method for calculating the reception interval of the packets that is determined from the actual transmission rate is similar to the method for calculating the reception interval of the packets that is determined from the target transmission rate, described according to the third embodiment. When the reception interval of the packets detected by the packet analyzing unit 103 is greater than the reception interval of the packets determined from the actual transmission rate, the process to decrease the target transmission rate is performed.

(2) Configuration of the Image Information Transmission Apparatus 260

Figure 12:
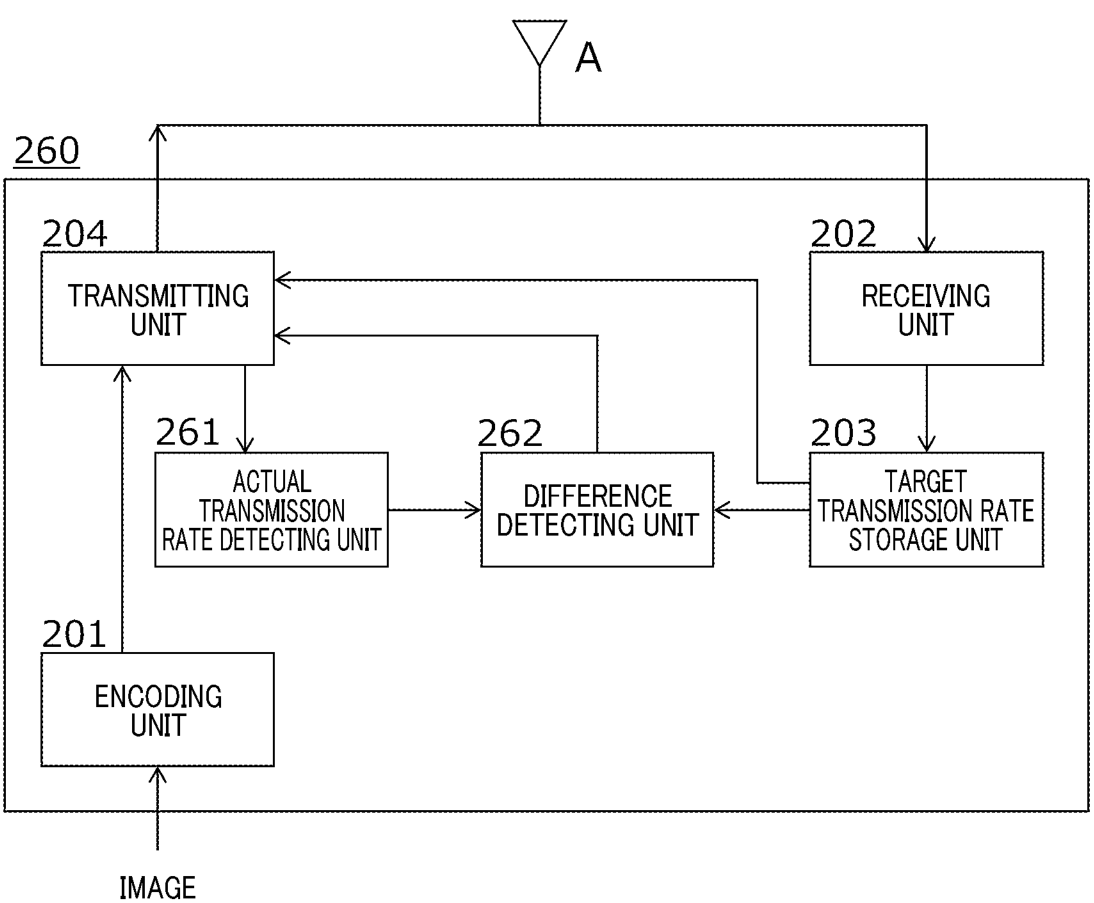
FIG. 12 is a configuration diagram illustrating the image information transmission apparatus according to the fourth embodiment of the present disclosure.

As shown in FIG. 12, the image information transmission apparatus 260 includes an actual transmission rate detecting unit 261 and a difference detecting unit 262 in addition to the configuration of the image information transmission apparatus 200 according to the first embodiment. Regarding configurations that are similar to those according to the first embodiment, the descriptions according to the first embodiment are cited. Descriptions thereof are omitted.

The actual transmission rate detecting unit 261 detects the actual transmission rate that is the transmission rate at which the image information generated by the encoding unit 201 is transmitted by the transmitting unit 204. The actual transmission rate is a speed at which the image information is actually transmitted.

The difference detecting unit 262 detects a difference between the target transmission rate that is read from the target transmission rate storage unit 203 and the actual transmission rate that is detected by the actual transmission rate detecting unit 261. Here, the difference is merely required to include subtraction and includes not only a simple difference $(x-y)$, but also an absolute value difference $|x-y|$, a difference of squares $(x^2-y^2)$, a square root of a difference $((x-y)^{1/2})$, a weighted difference $(ax-by$: a and b being constants), and the like.

When the difference is greater than a predetermined value, the transmitting unit 204 transmits the actual transmission rate to the image information reception apparatus 160. Here, the predetermined value includes a variable that varies depending on conditions, in addition to a fixed value. Furthermore, in addition to a numeric value, a case in which the predetermined value is expressed by a plurality of sets by quantization is also included. Where ranges are described, they may or may not include boundary values.

For example, the predetermined value may be set to 0.2 Mbps. For example, when the target transmission rate is 2 Mbps and the actual transmission rate is 2.25 Mbps, the difference may be 0.25 Mbps that is greater than the predetermined value set to 0.2 Mbps. Thus, the transmitting unit 204 transmits, to the image information reception apparatus 160, the value of 2.25 Mbps that is the actual transmission rate.

As another example, the predetermined value may be set to zero. In this case, the transmitting unit 204 always transmits the actual transmission rate to the image information reception apparatus 160.

(3) Operations of the Image Information Reception Apparatus 160 and the Image Information Transmission Apparatus 260

Figure 13:
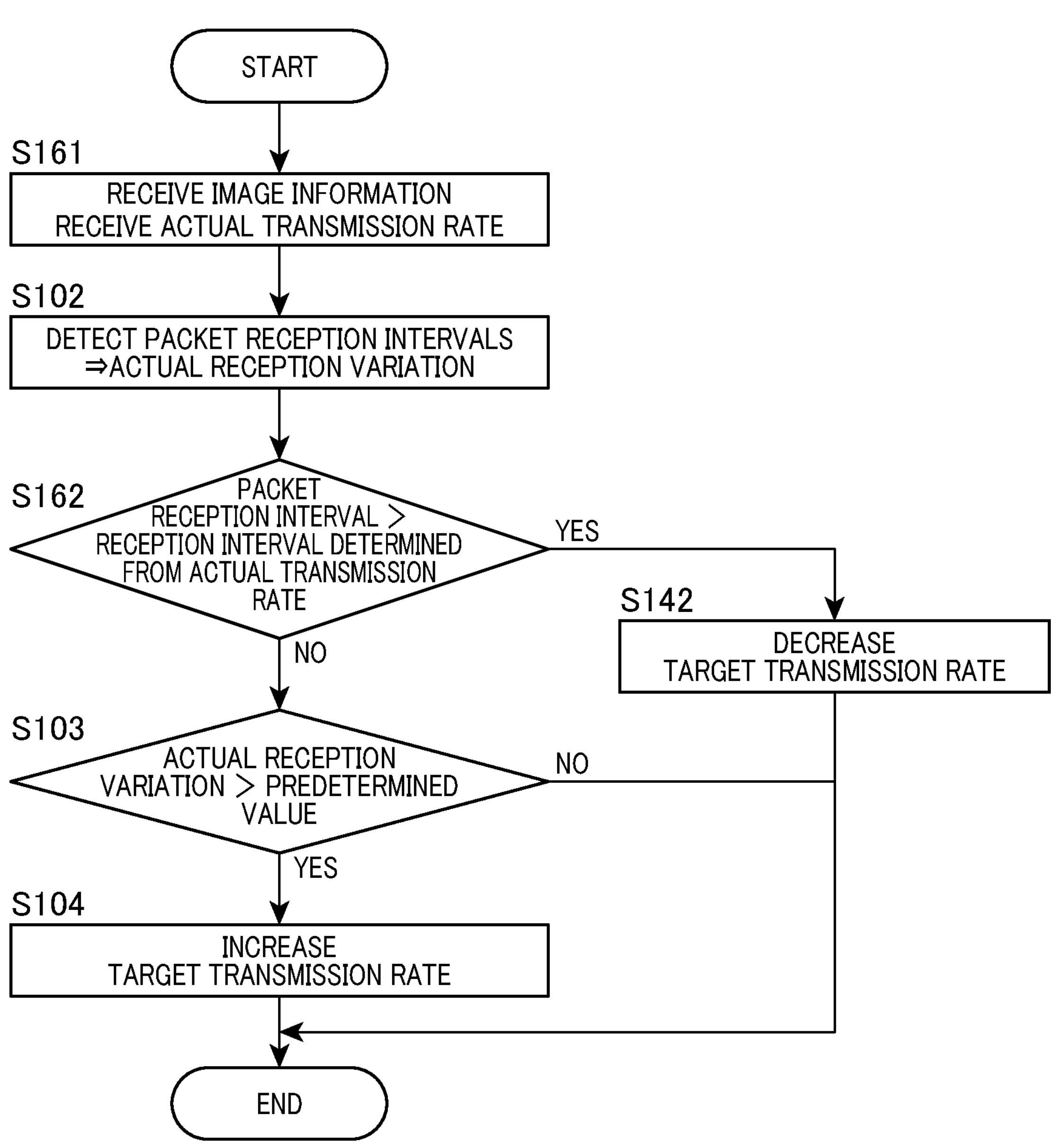
FIG. 13 is a flowchart illustrating operations of the image information reception apparatus according to the fourth embodiment of the present disclosure.

Operations of the image information reception apparatus 160 will be described with reference to a flowchart in FIG. 13. The flowchart in FIG. 13 is the flowchart in FIG. 11 that shows the operations of the image information reception apparatus 140 according to the third embodiment in which step S161 is provided instead of step S101 and step S162 is provided instead of step S141. The descriptions with reference to FIG. 11 or the descriptions with reference to FIG. 6 that are cited for FIG. 11 are cited regarding steps that are common with FIG. 11. Descriptions thereof are omitted.

At step S161, the receiving unit 101 receives, from the image information transmission apparatus 260, the actual transmission rate that is the speed at which the image information is actually transmitted. At step S162, the transmission rate change processing unit 104 compares the reception interval of the packets that is determined from the received actual transmission rate and the reception interval of the packets that is actually detected by the packet analyzing unit 103.

When the reception interval of the packets detected by the packet analyzing unit 103 is greater than the reception interval of the packets determined from the actual transmission rate, at step S142, the process to decrease the target transmission rate is performed. When the reception interval of the packets detected by the packet analyzing unit 103 is equal to or less than the reception interval of the packets determined from the actual transmission rate, the process proceeds to step S103.

Figure 14:
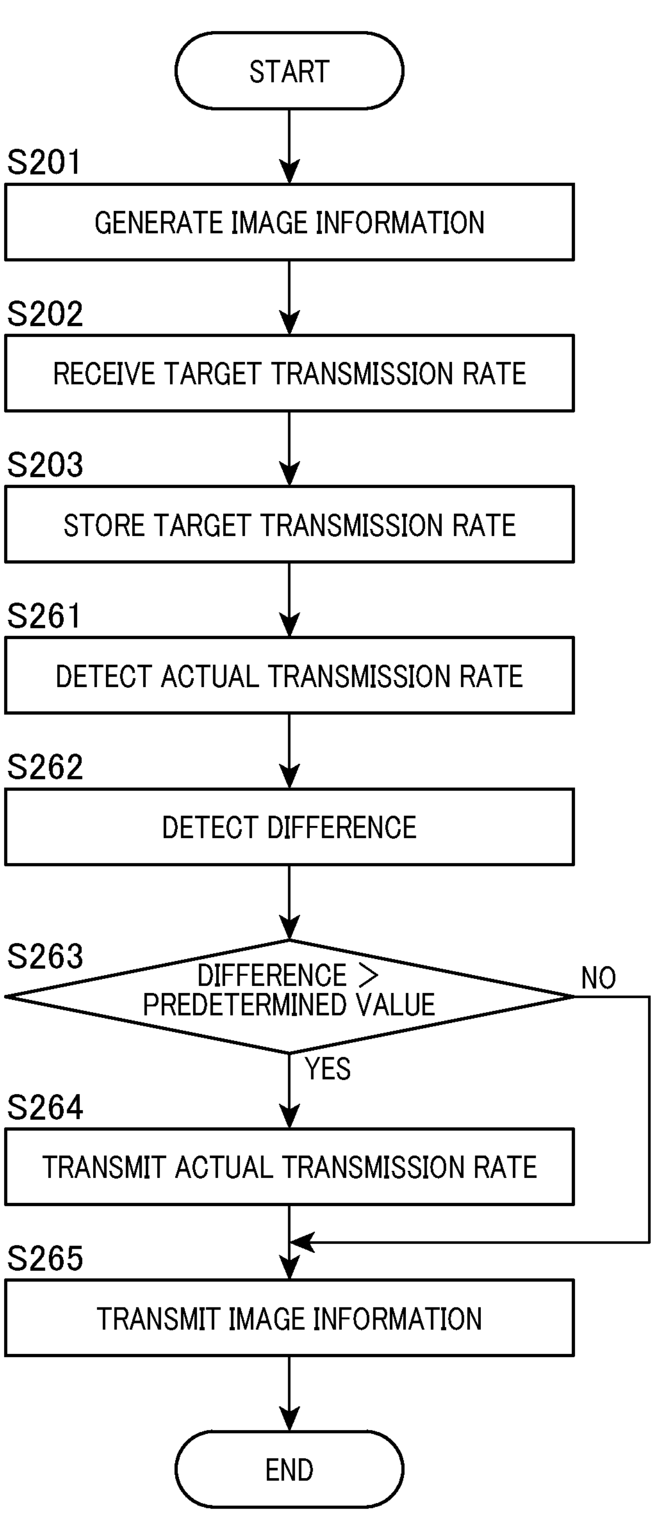
FIG. 14 is a flowchart illustrating operations of the image information transmission apparatus according to the fourth embodiment of the present disclosure.

Operations of the image information transmission apparatus 260 will be described with reference to a flowchart in FIG. 14. The flowchart in FIG. 14 is the flowchart in FIG. 7 that shows the operations of the image information transmission apparatus 200 according to the first embodiment to which step S261 to step S264 are added. In addition, step S265 is provided instead of step S204. The descriptions with reference to FIG. 7 are cited regarding steps that are common with FIG. 7. Descriptions thereof are omitted.

At step S261, the actual transmission rate detecting unit 261 detects the actual transmission rate that is the transmission rate at which the image information generated by the encoding unit 201 is transmitted by the transmitting unit 204. At step S262, the difference detecting unit 262 detects the difference between the target transmission rate that is read from the target transmission rate storage unit 203 and the actual transmission rate that is detected by the actual transmission rate detecting unit 261.

At step S263, when the difference detected by the difference detecting unit 262 is greater than the predetermined value, the process proceeds to step S264. When the difference detected by the difference detecting unit 262 is equal to or less than the predetermined value, the process proceeds to step S265.

At step S264, the transmitting unit 204 transmits the actual transmission rate to the image information reception apparatus 160. At step S265, the transmitting unit 204 transmits the image information to the image information reception apparatus 160. Here, when processing is performed by way of step S264, the present step may be performed simultaneously with step S264.

(3) Effects

As described above, according to the fourth embodiment, estimation of the communication bandwidth can be performed based on the actual transmission rate. Consequently, a more accurate estimation of the communication bandwidth can be performed.

7. Other Embodiments

An embodiment that includes both configurations according the second embodiment and the third embodiment is also possible. An embodiment that includes both configurations according to the second embodiment and the fourth embodiment is also possible. An embodiment that includes all configurations according to the second embodiment, the third embodiment, and the fourth embodiment is also possible. In addition, arbitrary embodiments may be combined as long as the embodiments do not have a relationship in which coexistence is not possible in terms of functional workings.

Characteristics of the apparatuses and the like according to the embodiments of the present disclosure are described above.

Terms that are used according to the embodiments are examples. Therefore, the terms may be replaced by synonymous terms or terms that include synonymous functions.

In a block diagram that is used to describe an embodiment, configurations of an apparatus are grouped or arranged by function. A block that indicates a function is implemented by an arbitrary combination of hardware or software. In addition, because the block diagram indicates functions, the block diagram can also be understood to be a disclosure of a method and a program that implements the method.

The order of functional blocks that can be understood to be a process, a flow, and a method according to the embodiment may be interchanged as long as constraints, such as a relationship in which one step uses a result from another earlier step, are not present.

First, second, to N th (N being an integer) that are terms used according to the embodiments and in the scope of claims are used to differentiate between two or more configurations or methods of a same type and do not serve to limit order or superiority.

According to the embodiments, an apparatus that is mounted in a vehicle is assumed. However, the present disclosure also includes dedicated or general-purpose apparatuses other than a vehicle, unless particularly limited by the scope of claims.

According to the embodiments, an apparatus that is mounted in a vehicle is assumed. However, an apparatus that is held by a pedestrian may be used.

In addition, the following can be used as examples of aspects of the apparatus of the present disclosure. A semiconductor element, an electronic circuit, a module, and a microcomputer can be used as aspects of a component. An ECU and a system board can be used as aspects of a half-finished product. A mobile phone, a smartphone, a tablet, a PC, a workstation, and a server can be used as aspects of a finished product.

In addition to the foregoing, devices that provide a communication function and the like are included. For example, a video camera, a still camera, and a car navigation system can be used.

The apparatus of the present disclosure is assumed to be used for the purpose of providing various services in the form of a server apparatus. In accompaniment with the provision of these services, the apparatus of the present disclosure is used, the method of the present disclosure is used, and/or the program of the present disclosure is run.

Furthermore, in addition to being implemented as dedicated hardware that provides the configurations and functions described according to the embodiments, the present disclosure can be implemented as a combination of a program for actualizing the present disclosure that is recorded in a storage medium such as a memory or a hard disk, and general-purpose hardware that includes a dedicated or general-purpose central processing unit (CPU) that is capable of running the program, a memory, and the like.

A program that is stored in a non-transitory computer-readable (tangible) medium medium (such as an external storage apparatus (such as a hard disk, a Universal Serial Bus (USB) memory, or a compact disc (CD)/Blu-ray Disc (BD) or an internal storage apparatus (such as a random access memory (RAM) or a read-only memory (ROM)) of dedicated or general-purpose hardware can be provided in the dedicated or general-purpose hardware through the storage medium or from a server by way of a communication line without going through the storage medium. Consequently, newest functions can be provided at all times through upgrades in the program.

The apparatus of the present disclosure is described as an electronic control apparatus for a vehicle that is mainly mounted in an automobile. However, the apparatus can be applied to all moving bodies that move, such as motorcycles, motorized bicycles, and trains, as well as pedestrians, ships, and airplanes.

What is claimed is:

1. An image information reception apparatus comprising:

a receiving unit that receives image information from an image information transmission apparatus through a communication network, the image information including an image encoded using inter-frame prediction;

a packet analyzing unit that determines an actual reception variation that is based on variations in a reception interval of packets that are included in the image information; and a transmission rate change processing unit that performs a process to increase a target transmission rate of the image information transmission apparatus in response to the actual reception variation being:

greater than a predetermined value; and determined to be attributed to a difference in data amount between an I frame, and a P frame or a B frame determined by the inter-frame prediction.

2. The image information reception apparatus according to claim 1, wherein:

the transmission rate change processing unit performs determination by comparing a standard variation and the actual reception variation, the standard variation being determined from the difference in data amount between the I frame, and the P frame or the B frame determined by a standard image being encoded.

3. The image information reception apparatus according to claim 1, wherein:

the receiving unit further receives an actual transmission variation that is determined from the difference in data amount between the I frame, and the P frame or the B frame of the image information generated by the image information transmission apparatus; and the transmission rate change processing unit performs determination by comparing the actual transmission variation and the actual reception variation.

4. The image information reception apparatus according to claim 1, wherein: the image information is an image that is encoded using Motion Joint Photographic Experts Group.

5. The image information reception apparatus according to claim 1, wherein: the transmission rate change processing unit performs a process to decrease the target transmission rate in response to the reception interval of the packets being greater than a reception interval that is determined from the target transmission rate.

6. The image information reception apparatus according to claim 1, wherein: the receiving unit receives an actual transmission rate that is a speed at which the image information is actually transmitted from the image information transmission apparatus; and the transmission rate change processing unit performs a process for decreasing the target transmission rate in response to the reception interval of the packets being greater than a reception interval that is determined from the actual transmission rate.

7. The image information reception apparatus according to claim 1, wherein:

the image information transmission apparatus is mounted in a moving body.

8. The image information reception apparatus according to claim 7, wherein; the image information reception apparatus is mounted in a second moving body that differs from a first moving body that is the moving body.

9. An image information reception method comprising:

receiving image information from an image information transmission apparatus through a communication network, the image information including an image encoded using inter-frame prediction;

determining an actual reception variation that is based on variations in a reception interval of packets that are included in the image information; and performing a process to increase a target transmission rate of the image information transmission apparatus in response to the actual reception variation being:

greater than a predetermined value; and determined to be attributed to a difference in data amount between an I frame, and a P frame or a B frame determined by the inter-frame prediction.

10. A non-transitory computer-readable storage medium storing therein an image information reception program that is implemented by a computer, the image information reception program causing the computer to implement:

receiving image information from an image information transmission apparatus through a communication network, the image information including an image encoded using inter-frame prediction;

determining an actual reception variation that is based on variations in a reception interval of packets that are included in the image information; and performing a process to increase a target transmission rate of the image information transmission apparatus in response to the actual reception variation being:

greater than a predetermined value; and determined to be attributed to a difference in data amount between an I frame, and a P frame or a B frame determined by the inter-frame prediction.

* * * * *